United States Patent
Burke et al.

(10) Patent No.: US 10,955,014 B1
(45) Date of Patent: Mar. 23, 2021

(54) SWITCHABLE RATCHETING CLUTCH WITH LIFT OFF BUMP STOP

(71) Applicant: Schaeffler Technologies AG & Co. KG, Herzogenaurach (DE)

(72) Inventors: Peter Burke, Charlotte, NC (US); Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/576,831

(22) Filed: Sep. 20, 2019

(51) Int. Cl.
  *F16D 41/12* (2006.01)
  *F16D 43/16* (2006.01)
  *F16D 41/08* (2006.01)

(52) U.S. Cl.
  CPC ............. *F16D 43/16* (2013.01); *F16D 41/12* (2013.01); *F16D 41/084* (2013.01)

(58) Field of Classification Search
  None
  See application file for complete search history.

(56) References Cited

U.S. PATENT DOCUMENTS

| | | | |
|---|---|---|---|
| 6,244,965 B1 | 6/2001 | Klecker et al. | |
| 6,481,551 B1 | 11/2002 | Ruth | |
| 9,109,636 B2 | 8/2015 | Kimes et al. | |
| 9,121,454 B2 | 9/2015 | Pawley | |
| 2004/0118654 A1* | 6/2004 | Robuck | F16D 41/12 192/46 |
| 2007/0278061 A1* | 12/2007 | Wittkopp | F16H 3/10 192/43.1 |
| 2008/0093189 A1* | 4/2008 | Wiesneth | F16F 15/1202 192/45.1 |
| 2018/0266502 A1 | 9/2018 | Shiori et al. | |
| 2018/0274604 A1 | 9/2018 | Ince | |
| 2019/0293131 A1* | 9/2019 | Campton | F16D 11/02 |

* cited by examiner

*Primary Examiner* — Charles A Fox
*Assistant Examiner* — Ryan P Dodd (57) ABSTRACT

A clutch, including: an inner race forming a pocket; an outer race; a pawl including a portion in the pocket; and a cage radially disposed between the inner race and the outer race. The cage includes a radially outer surface segment and a lift off bump stop extending from the surface segment. For a one-way mode, the inner race rotates, with respect to the outer race, only in one circumferential direction. For a first phase of the one-way mode, the inner race rotates in the circumferential direction and the pawl is arranged to be in contact with the outer race and free of contact with the lift off bump stop. For a second phase of the one-way mode: the inner TO race rotates in the first circumferential direction; and the pawl is arranged to be in contact with the lift off bump stop and free of contact with the outer race.

20 Claims, 11 Drawing Sheets

SWITCHABLE RATCHETING CLUTCH WITH LIFT OFF BUMP STOP

TECHNICAL FIELD

The present disclosure relates to a switchable ratcheting clutch with lift off bump stops enabling drag-free operation in a one-way mode of the clutch.

BACKGROUND

For known ratcheting one-way clutches, contact between locking elements of the clutch and a race of the clutch causes drag when the clutch is operating in a one-way mode.

SUMMARY

According to aspects illustrated herein, there is provided a switchable ratcheting clutch, including: an inner race forming a pocket and supported for rotation about an axis of rotation; an outer race; a pawl including a portion disposed in the pocket, the portion of the pawl non-rotatable with respect to the inner race in a first circumferential direction around the axis of rotation; and a cage radially disposed between the inner race and the outer race. The cage includes a radially outer surface segment and a lift off bump stop extending radially outwardly from the radially outer surface segment. For a one-way mode of the switchable ratcheting clutch, the inner race is arranged to rotate, with respect to the outer race, only in the first circumferential direction. For a first phase of the one-way mode, the inner race is arranged to rotate in the first circumferential direction and the pawl is arranged to be in contact with the outer race and free of contact with the lift off bump stop. For a second phase of the one-way mode: the inner race is arranged to rotate in the first circumferential direction; and the pawl is arranged to be in contact with the lift off bump stop and free of contact with the outer race.

According to aspects illustrated herein, there is provided a switchable ratcheting clutch, including: an inner race forming a pocket and supported for rotation about an axis of rotation; an outer race; a pawl including a portion disposed in the pocket, the portion of the pawl non-rotatable with respect to the inner race in a first circumferential direction around the axis of rotation, pivotable around a pivot axis passing through the portion and the pocket and parallel to the axis or rotation, and including a center of gravity circumferentially off-set from the pivot axis in the first circumferential direction; a cage radially disposed between the inner race and the outer race. The cage including: a radially outer surface segment and a lift off bump stop extending radially outwardly from the radially outer surface segment. For a one-way mode of the switchable ratcheting clutch, the inner race is rotatable, with respect to the outer race, only in the first circumferential direction. For a first phase of the one-way mode: the inner race is arranged to rotate in the first circumferential direction; and the pawl is in contact with the outer race and free of contact with the lift off bump stop. For a second phase of the one-way mode: the inner race is arranged to rotate in the first circumferential direction; and the pawl is in contact the lift off bump stop and free of contact with the outer race. For a locked mode of the switchable ratcheting clutch, the inner race, the pawl, and the outer race are non-rotatably connected for rotation of the inner race in the first circumferential direction or the second circumferential direction.

According to aspects illustrated herein, there is provided a method of operating a switchable ratcheting clutch an inner race, an outer race, a cage radially disposed between the inner race and the outer race, and a pawl including a portion disposed in a pocket formed by the inner race, the portion of the pawl non-rotatable with respect to the inner race in a first circumferential direction around an axis of rotation around which the switchable ratcheting clutch is supported for rotation, the method comprising: for a first phase of a free-wheel mode of the switchable ratcheting clutch: rotating, with respect to the outer race and at or below a threshold speed of rotation, the inner race in the first circumferential direction; precluding contact between the pawl and a lift off bump stop extending radially outwardly from a radially outer surface segment of the cage; contacting the outer race with the pawl; and sliding the pawl along the outer race in the first circumferential direction; and to transition to a second phase of the free-wheel mode: increasing the speed of rotation of the inner race to above the threshold speed of rotation; pivoting, in a first pivot direction, the pawl around a pivot axis passing through the pawl and the pocket and parallel to the axis of rotation; breaking contact between the pawl and the outer race; contacting the lift off bump stop with the pawl; and blocking with the lift off bump stop, further pivoting of the pawl in the first pivot direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
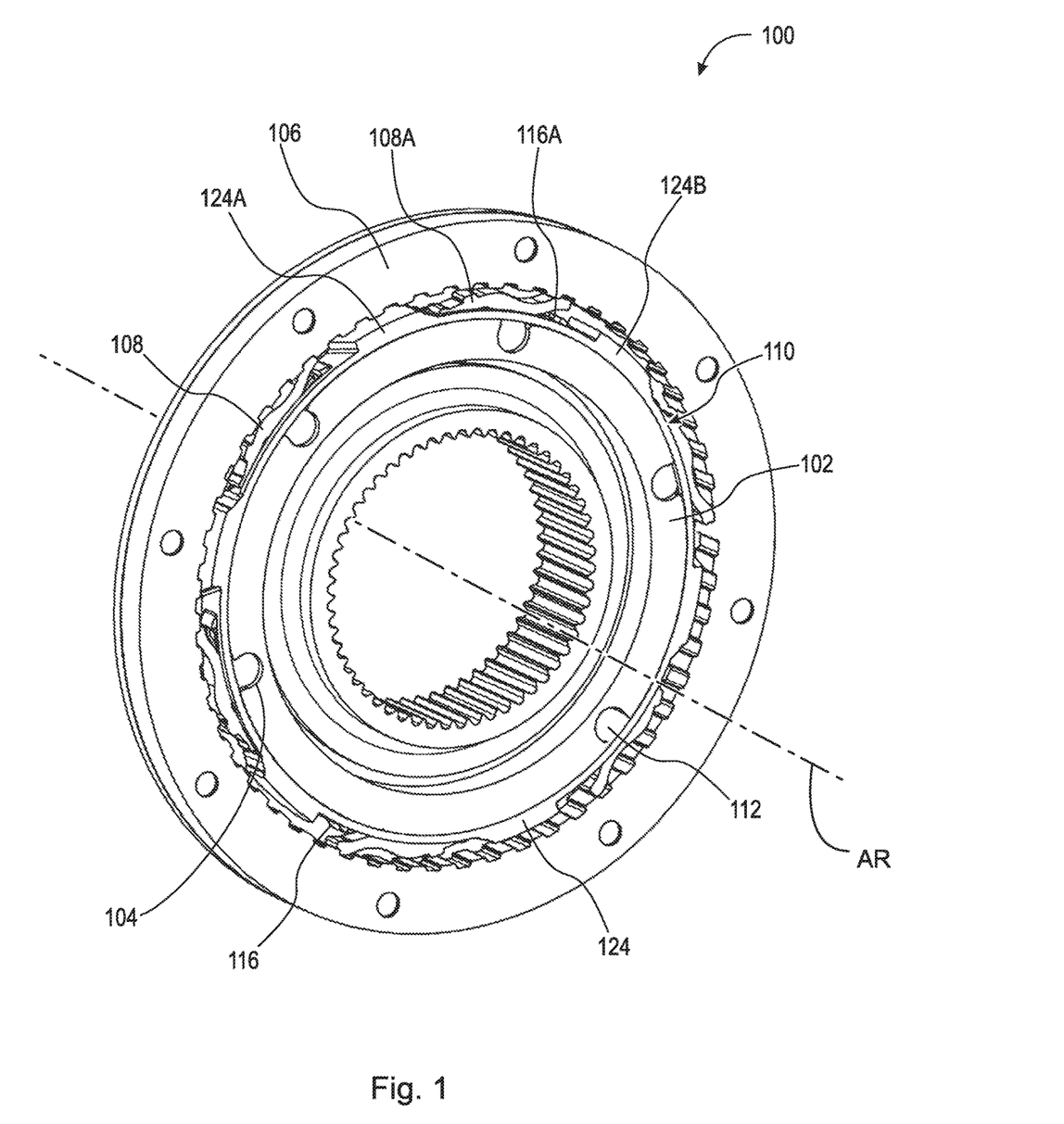
FIG. 1 is an isometric front view of a switchable ratcheting clutch in a first phase of a one-way mode of the switchable ratcheting clutch.

FIG. 1 is an isometric front view of switchable ratcheting clutch 100 in a first phase of a one-way mode of the switchable ratcheting clutch.

Figure 2:
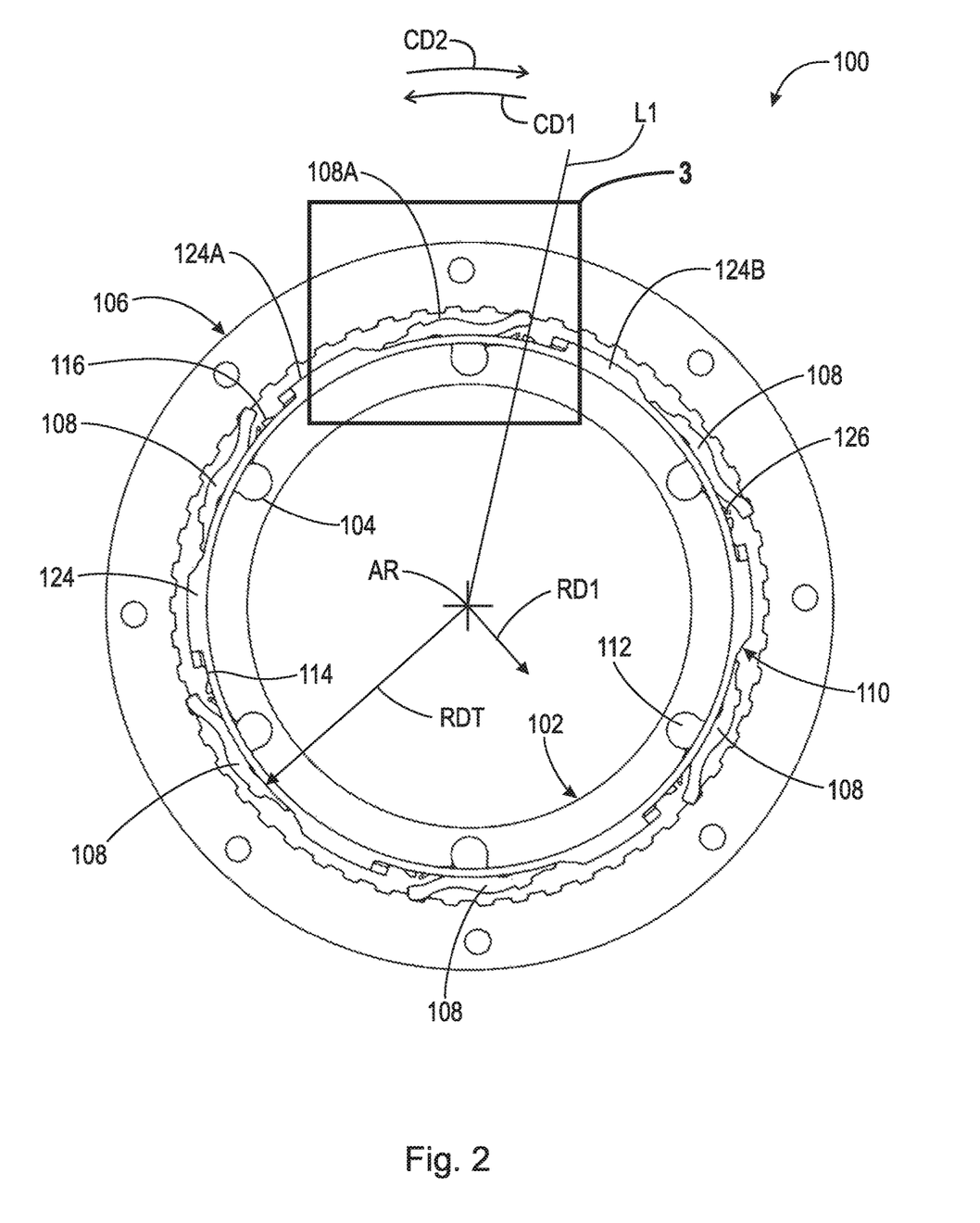
FIG. 2 is a front view of the switchable ratcheting clutch shown in FIG. 1.

FIG. 2 is a front view of switchable ratcheting clutch 100 shown in FIG. 1.

Figure 3:
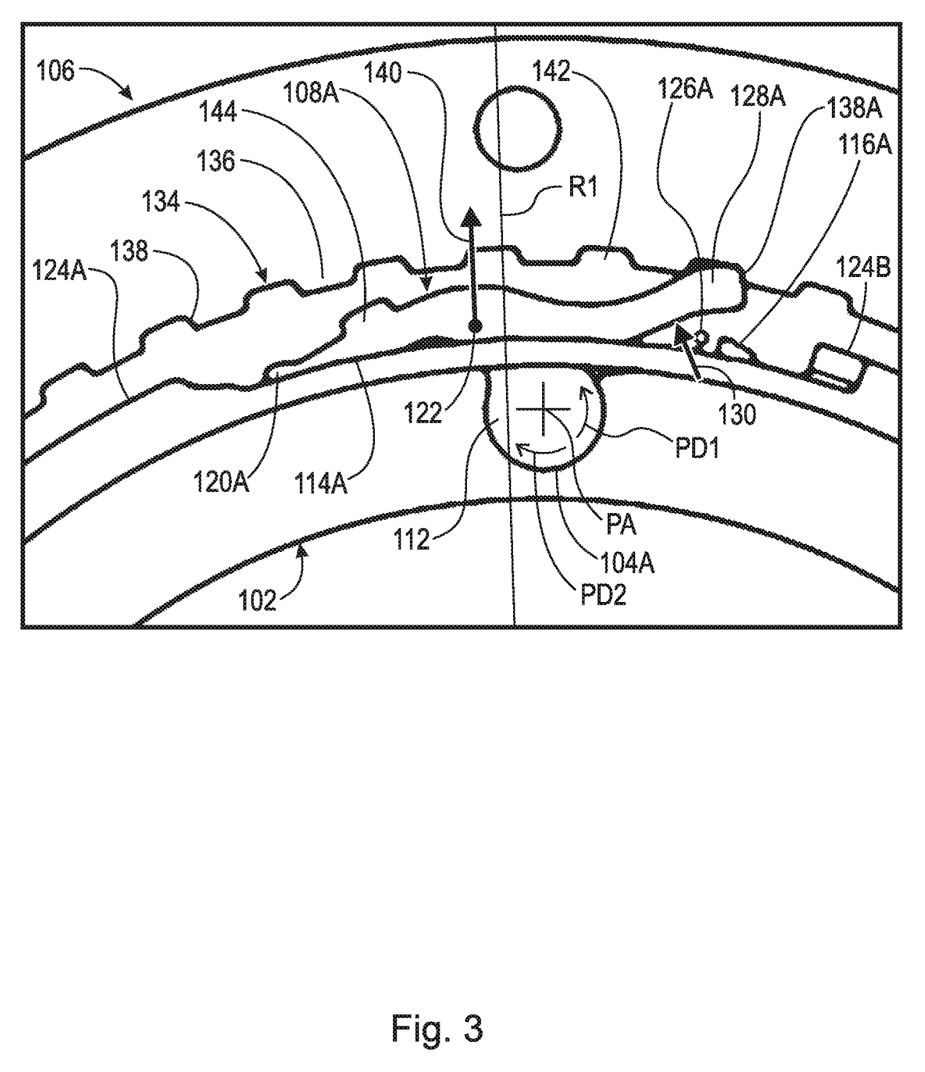
FIG. 3 is a detail of area 3 in FIG. 1.

FIG. 3 is a detail of area 3 in FIG. 1. The following should be viewed in light of FIGS. 1 through 3. Switchable ratcheting clutch 100 includes: inner race 102 forming pockets 104; outer race 106 radially offset, in radially outer direction RD1, from inner race 102; and pawls 108. Inner race 102 is supported for rotation around axis of rotation AR, and is arranged to receive rotational torque in circumferential direction CD1 and in circumferential direction CD2, opposite direction CD1. Directions CD1 and CD2 are around axis AR.

Clutch 100 includes cage 110 radially disposed between race 102 and race 106. Pawls 108 includes portions 112 disposed in pockets 104. Pawls 108 are pivotable within pockets 104, that is, are pivotable with respect to inner race 102. Portions 112 are non-rotatable with respect to inner race 102 in circumferential direction CD1 and circumferential direction CD2. That is, circumferential positions of portions 112 are fixed with respect to inner race 102. Pawls 108 are pivotable around pivot axis PA in pivot direction PD1 and pivot direction PD2, opposite pivot direction PD1. Each axis PA pass through a respective portion 112 and a respective pocket 104 and is parallel to axis AR.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs.

Figure 4:
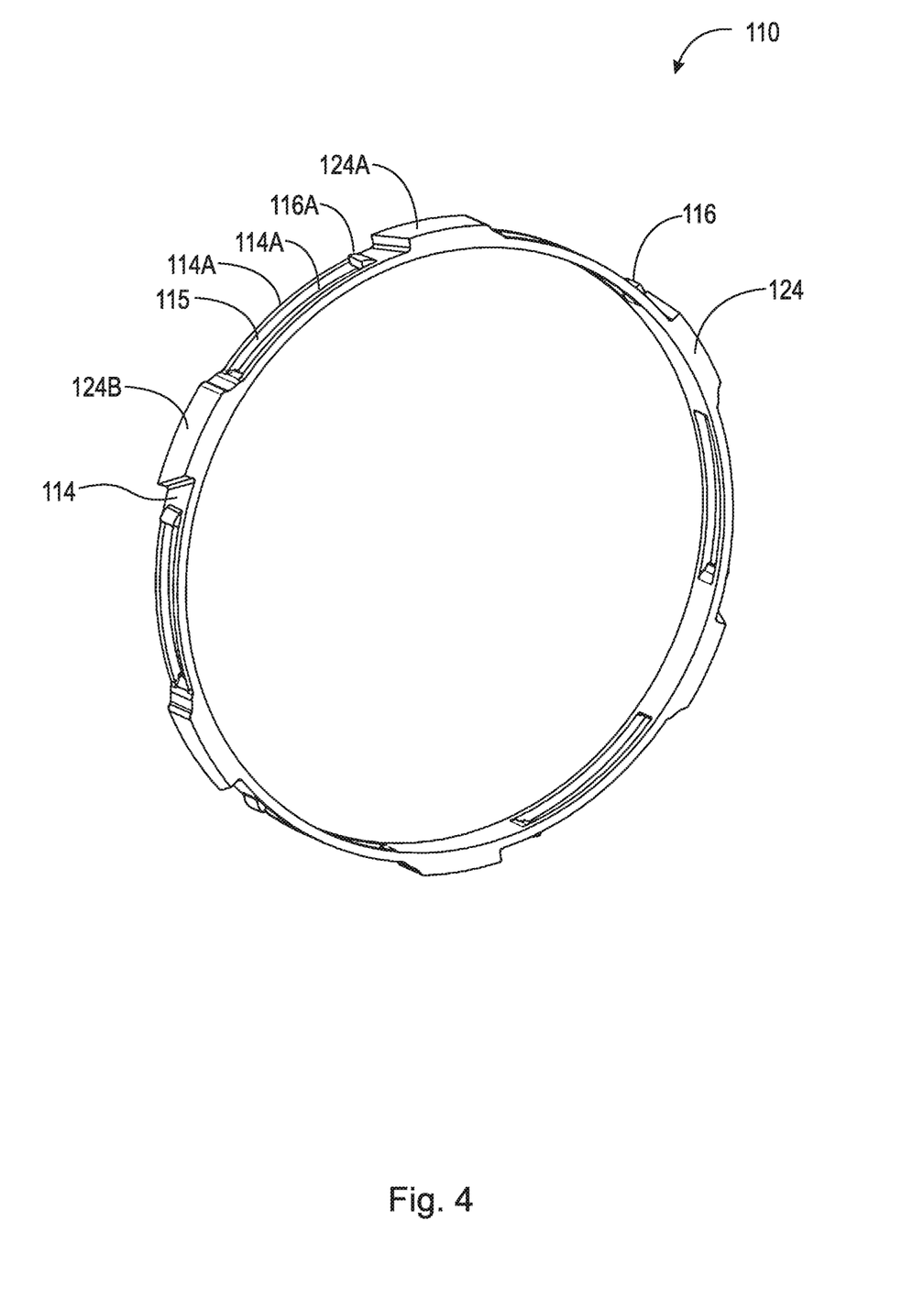
FIG. 4 is an isometric view of a cage of the ratcheting clutch shown in FIG. 1.

FIG. 4 is an isometric view of cage 110 of switchable ratcheting clutch 100 shown in FIG. 1.

Figure 5:
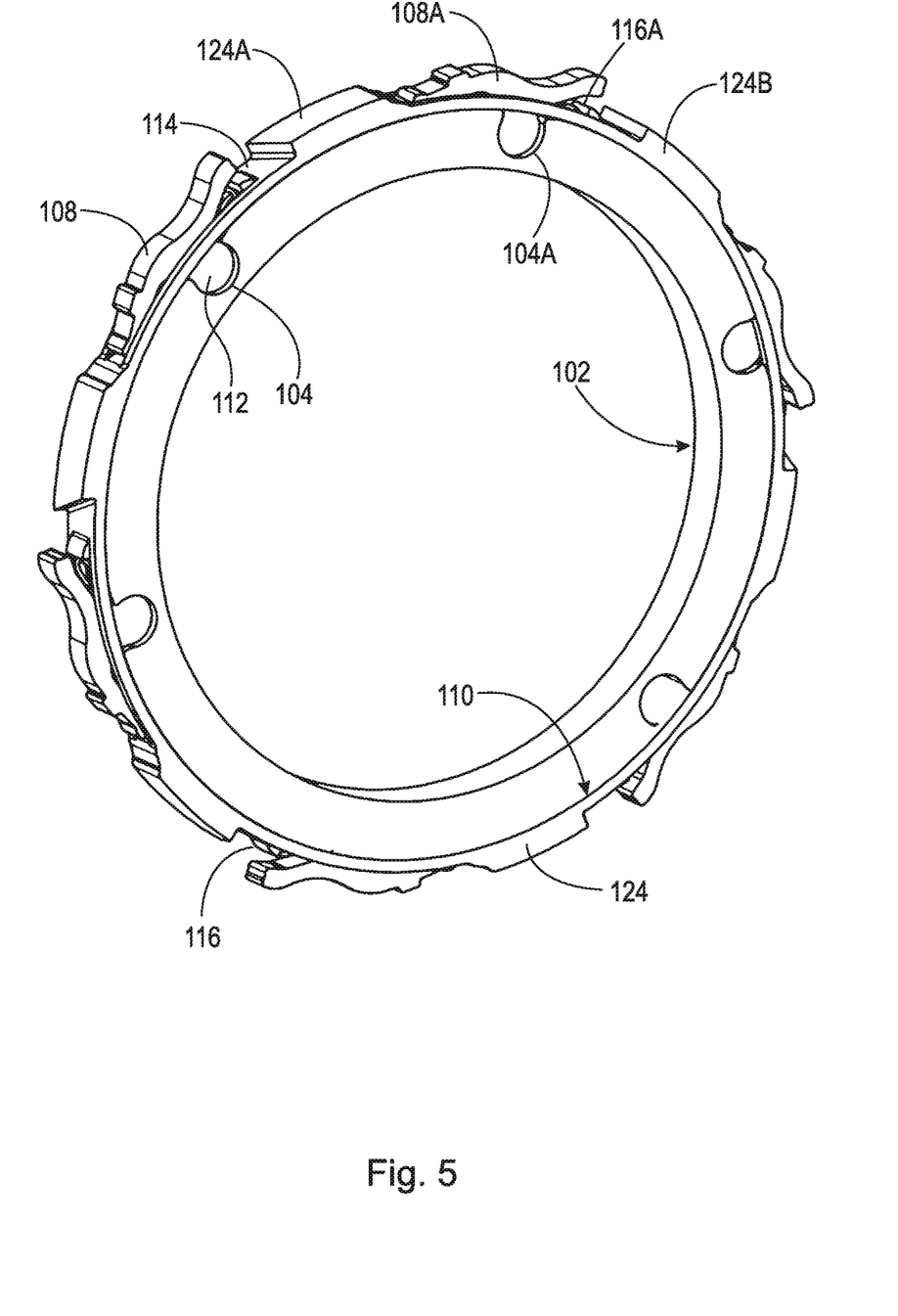
FIG. 5 is an isometric front view of the switchable ratcheting clutch shown in FIG. 1 with an outer race removed.

FIG. 5 is an isometric front view of switchable ratcheting clutch 100 shown in FIG. 1 with outer race 106 removed. The following should be viewed in light of FIGS. 1 through 5. Cage 110 includes: radially outer surface segments 114; openings 115 bounded by segments 114; and lift off bump stops 116 extending radially outwardly, in radially outer direction RD1, from radially outer surface segments 114. In an example embodiment, segments 114 are at uniform radial distance RDT from axis AR. Pawls 108 extend radially outwardly through openings 115.

Figure 6:
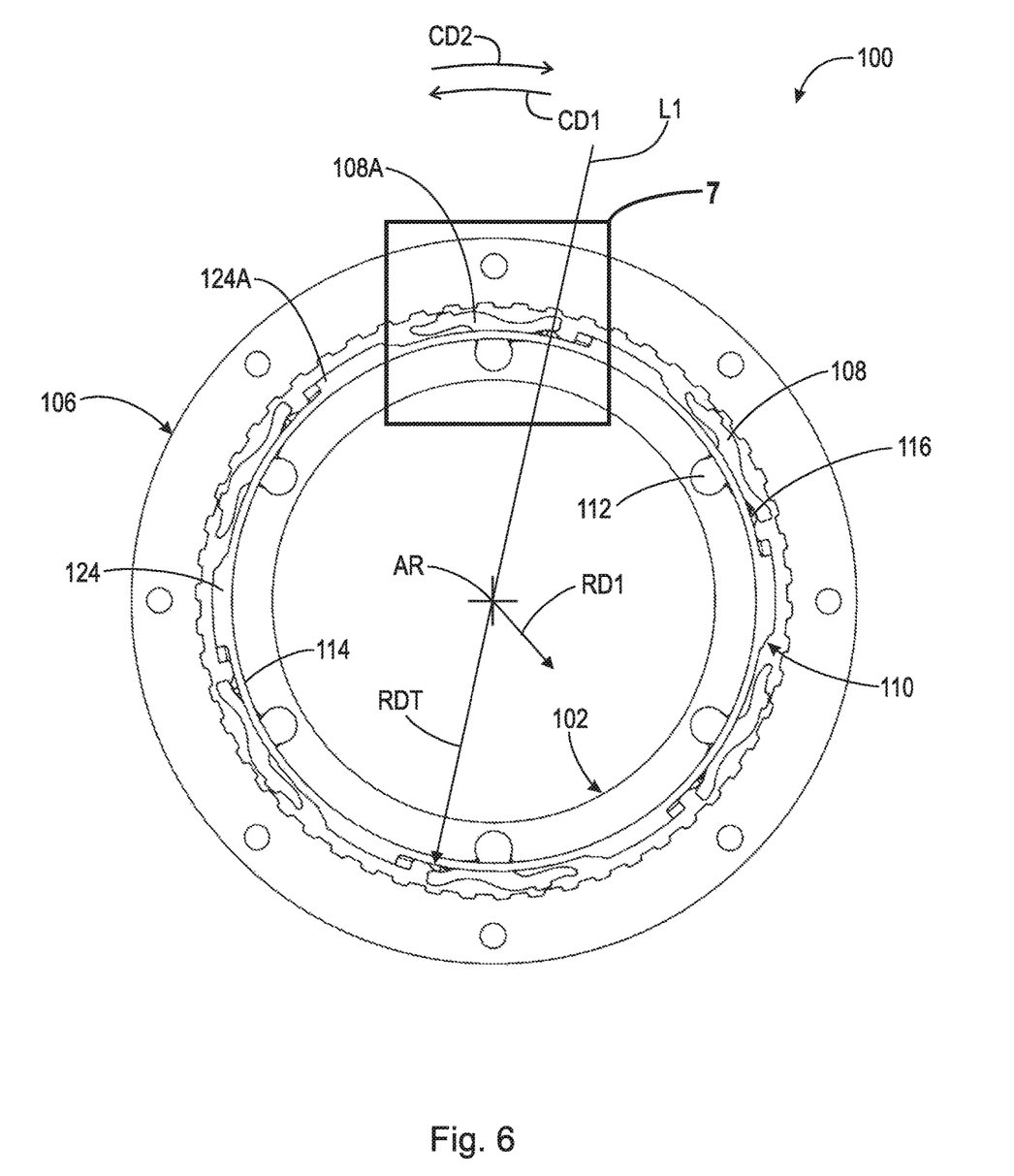
FIG. 6 is a front view of the switchable ratcheting clutch shown in FIG. 1 in a second phase of the one-way mode.

FIG. 6 is a front view of switchable ratcheting clutch 100 shown in FIG. 1 in a second phase of the one-way mode.

Figure 7:
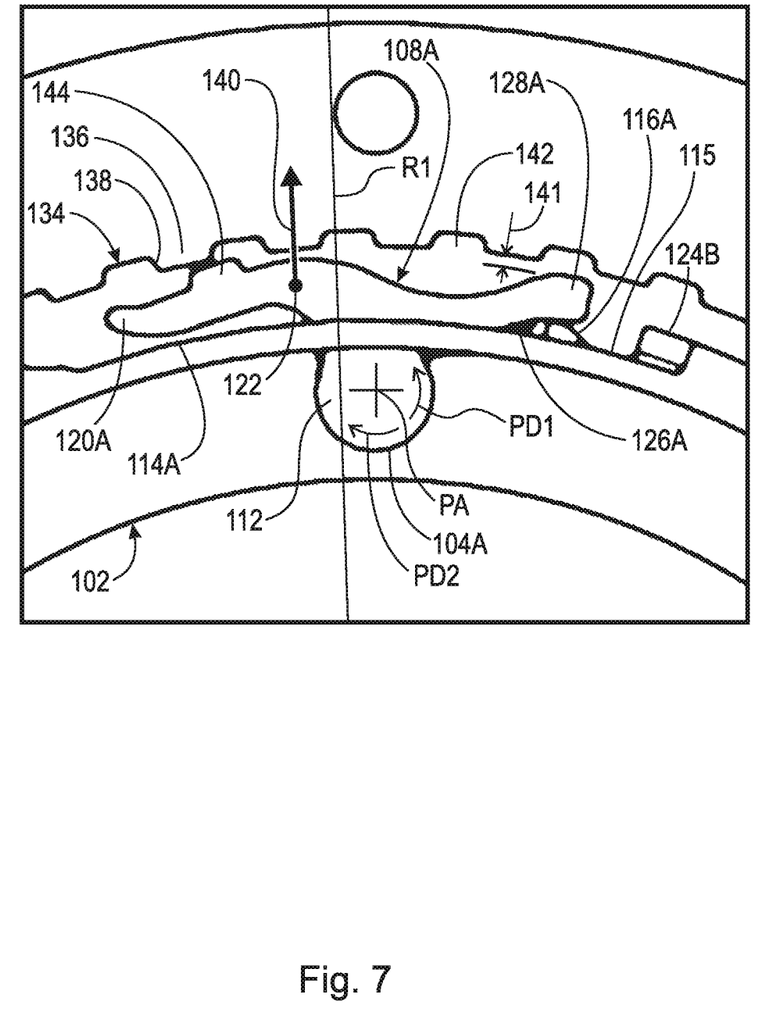
FIG. 7 is a detail of area 7 in FIG. 6.

FIG. 7 is a detail of area 7 in FIG. 6. The following should be viewed in light of FIGS. 1 through 7. In the one-way mode: inner race 102 is arranged to rotate with respect to outer race 106 only in direction CD1; and rotation of inner race 102, with respect to outer race 106, is precluded, or blocked in circumferential direction CD2.

In the first phase of the one-way mode: inner race 102 is arranged to rotate, with respect to outer race 106, in direction CD1; and pawls 108 are arranged to be free of contact with lift off bump stops 116. In the second phase of the one-way mode: inner race 102 is arranged to rotate, with respect to outer race 106, in direction CD1; and pawls 108 are arranged to be in contact with lift off bump stops 116.

In the first phase of the one-way mode, pawls 108 are arranged to: be in contact with outer race 106; and slide along outer race 106 in direction CD1. In the second phase of the one-way mode, pawls 108 are arranged to be free of contact with outer race 106.

In an example embodiment, in the first phase of the one-way mode, pawls 108, for example, circumferential ends 120 of pawls 108, are arranged to be in contact with radially outer surface segments 114. In an example embodiment in the second phase of the one-way mode, pawls 108 are arranged to be free of contact with radially outer surface segments 114.

Each pawl 108 includes center of gravity 122 circumferentially off-set from pivot axis PA of the pawl 108 in at least the one-way mode. In the example of FIG. 1, center of gravity 122 is off-set from pivot axis PA of the pawl 108 in circumferential direction CD1. For example: radius R1 from axis AR, passes between center of gravity 122 and axis PA for pawl 108A; center of gravity 122 for pawl 108A is past radius R1 in direction CD1; and axis PA for pawl 108A is past radius R1 in direction CD2. Stated otherwise, in at least the one-way mode, no radius from axis AR passes through both center of gravity 122 and axis PA for a particular pawl 108. Capital letters are used to designate a specific component from a group of components otherwise designated by a three digit number, for example, pawl 108A is a specific example from pawls 108.

For each pawl 108, pivot axis PA is circumferentially disposed between center of gravity 122 for the pawl 108 and a respective lift off bump stop 116, which the pawl 108 is arranged to contact in the second phase. In the example of FIG. 1, each pawl 108, the respective lift off bump stop 116 is off-set from pocket 104 for the pawl 108 in circumferential direction CD2.

Cage 110 includes ramps 124 extending radially outwardly and in direction CD1 from segments 114. For each pawl 108, pocket 104 is circumferentially disposed between a respective ramp 124, contacted by the pawl 108 in a locked mode (discussed below), and a respective lift off bump stop 116 contacted by the pawl 108 in the second phase. For example, for pawl 108A, pocket 104A is circumferentially disposed between ramp 124A and bump stop 116A. Segments 114 connect circumferentially adjacent pairs of ramps 124. For example, segment 114A connects ramp 124A and ramp 124B.

Figure 8:
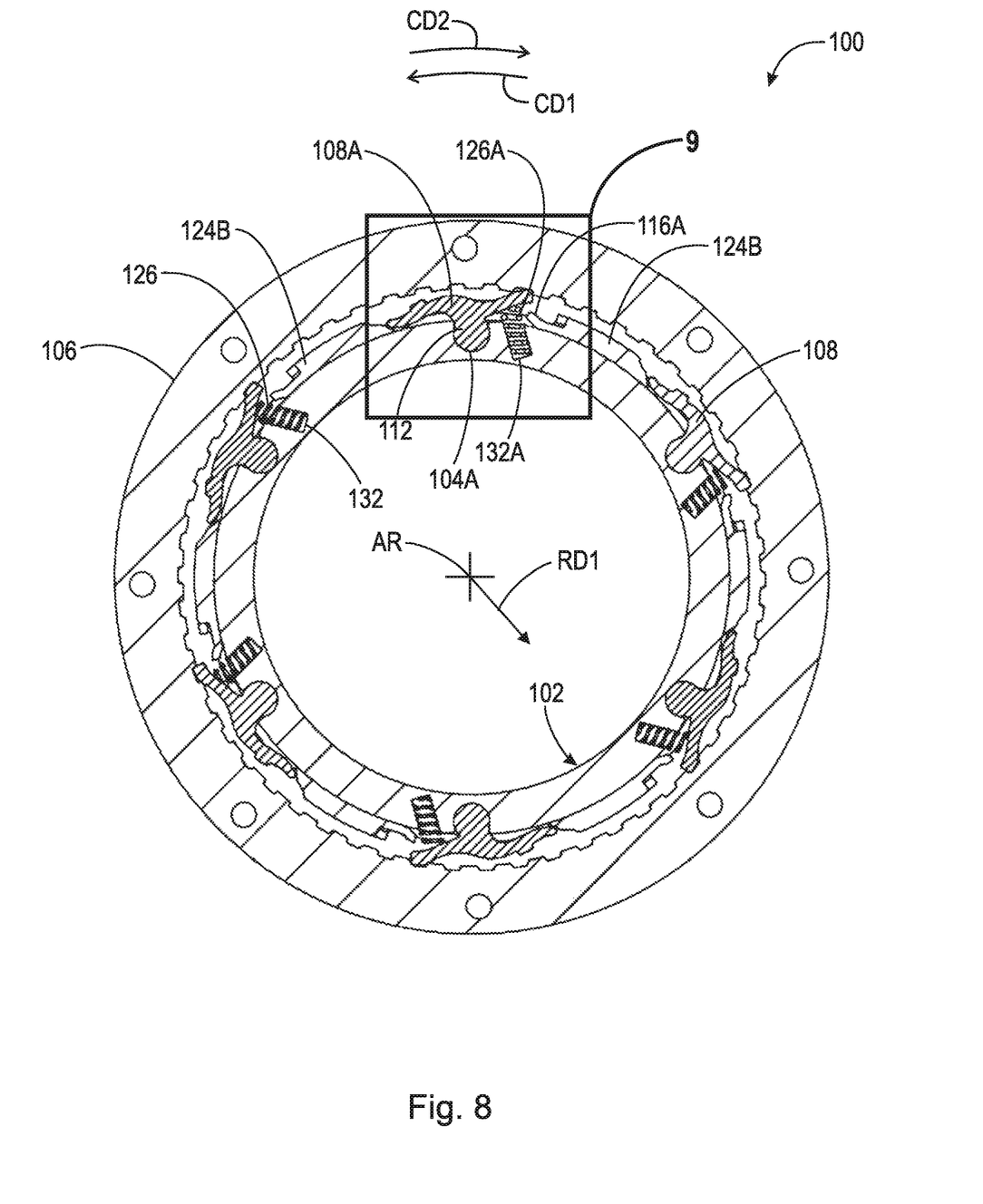
FIG. 8 is a cross-sectional view of the switchable ratcheting clutch shown in FIG. 1.

FIG. 8 is a cross-sectional view of switchable ratcheting clutch 100 shown in FIG. 1.

Figure 9:
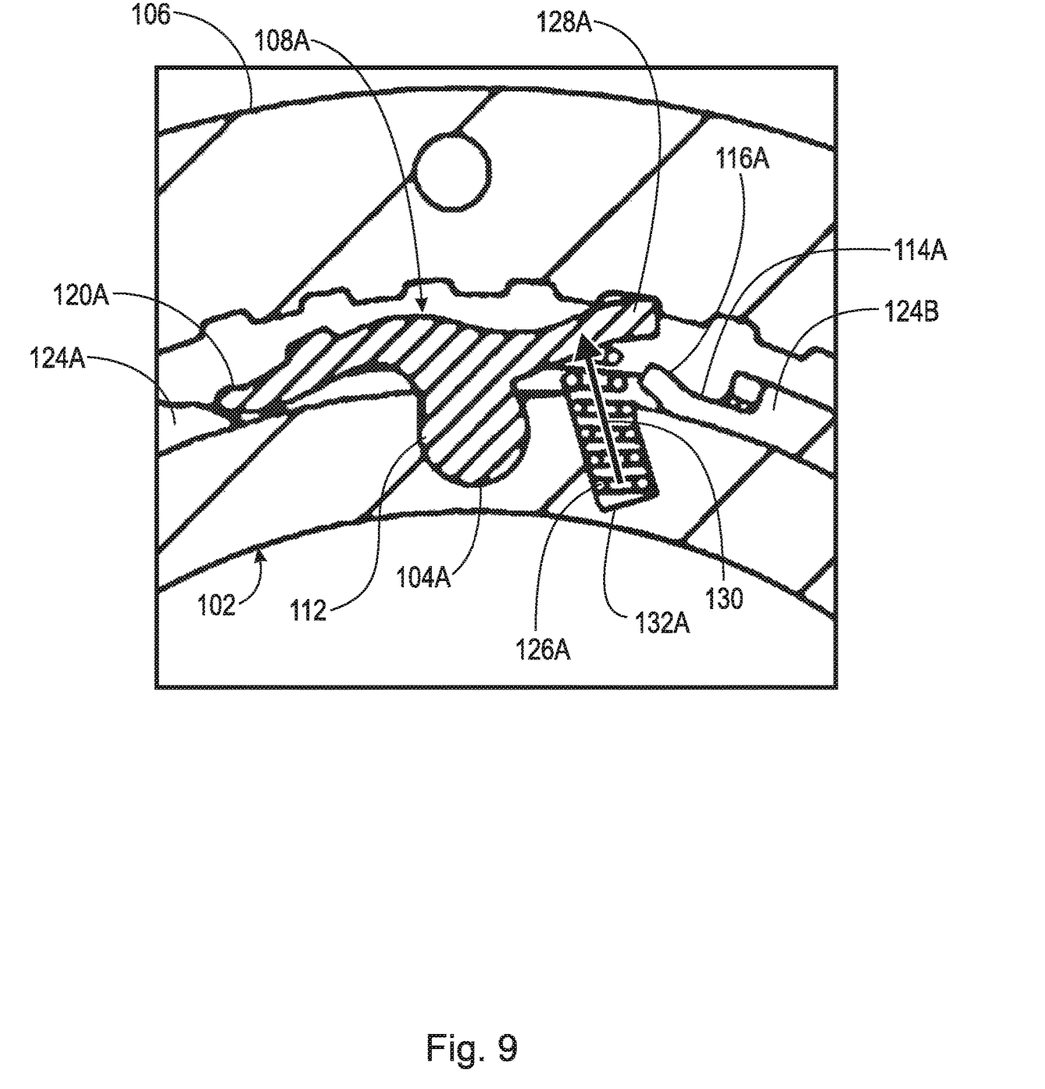
FIG. 9 is a detail of area 9 in FIG. 8.

FIG. 9 is a detail of area 9 in FIG. 8. The following should be viewed in light of FIGS. 1 through 9. Clutch 100 includes resilient elements 126, for example coil springs, in contact with pawls 108, for example in contact with circumferential ends 128 of pawls 108. Resilient elements 126 generate spring forces 130 urging pawls 108 in pivot direction PD1 around axis PA. In an example embodiment resilient elements 126 are disposed in indentations 132, formed by inner race 102.

In an example embodiment, outer race 106 includes radially inner surface 134 with radially inwardly extending teeth 136. To transition from the first or second phase, while in the one-way mode: the direction of rotation of inner race 102 is reversed to direction CD2; resilient elements 126 pivot pawls 108 in direction PD1 to displace ends 128 into contact with surface 134; and rotation of inner race 102, with respect to outer race 106, in direction CD2 causes ends 128 to contact walls 138 of respective teeth 136, blocking further rotation of inner race 102, with respect to outer race 106, in direction CD2, For example, in FIG. 3, end 128A is in contact with wall 138A In an example embodiment, ends 120 are in contact with segments 114 for rotation of inner race 102 in direction CD2 while in the one-way mode. Race 106 can be grounded (non-rotatable) or rotatable. If race 106 is grounded, further rotation of inner race 102 in direction CD2 is blocked. If race 106 is rotatable, race 102 and race 106 both rotate in direction CD2.

In the first phase of the one-way mode, resilient elements 126 displace ends 128 into contact with surface 134. Rotation of inner race 102, with respect to outer race 106, in direction CD1 causes ends 128 to contact and slide along (ratchet with respect to) teeth 136, without rotationally connected pawls 108 and race 106.

Figure 10:
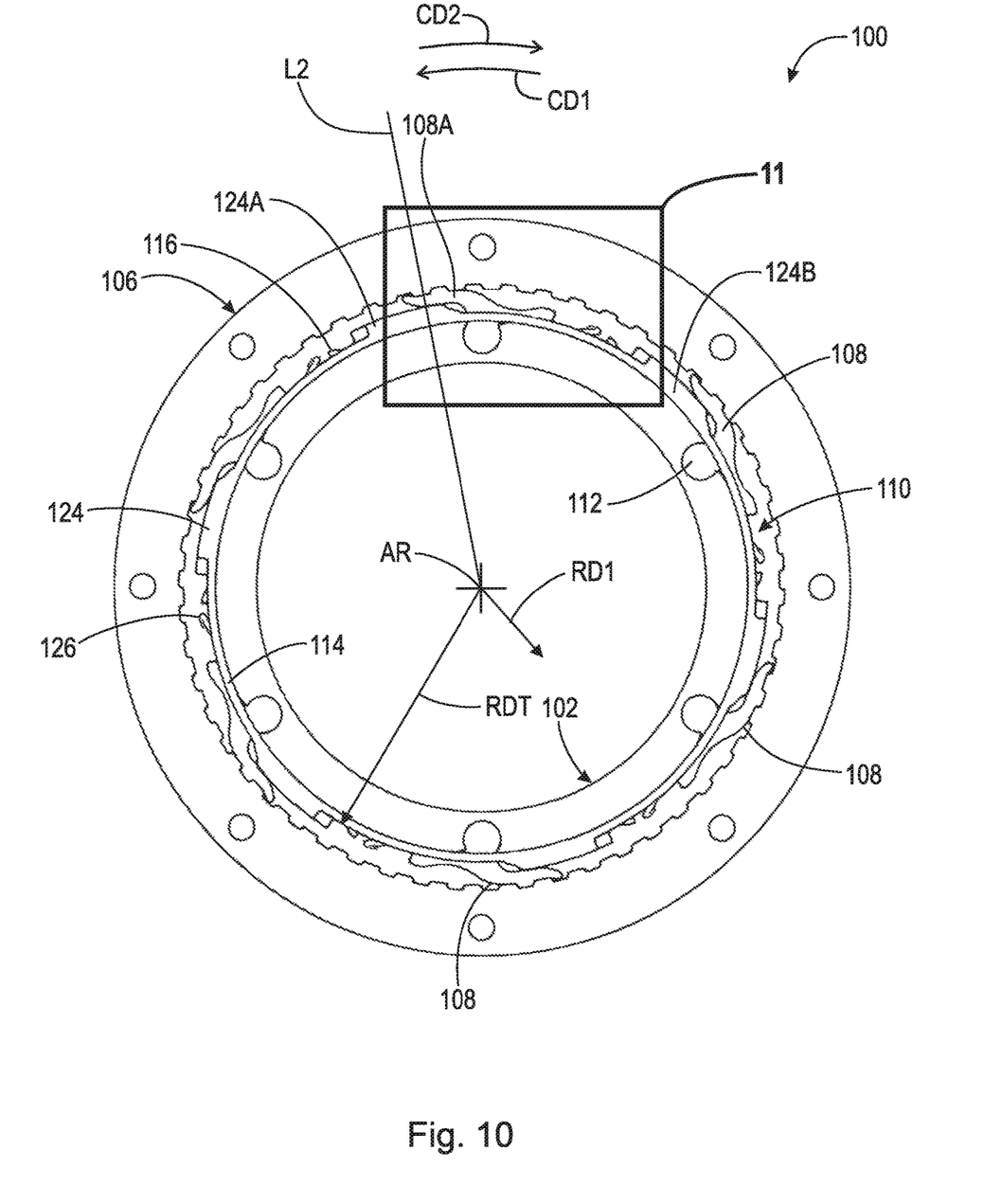
FIG. 10 is a front view of the switchable ratcheting clutch shown in FIG. 1 in a locked mode of the switchable ratcheting clutch.

FIG. 10 is a front view of switchable ratcheting clutch 100 shown in FIG. 1 in a locked mode of switchable ratcheting clutch 100.

Figure 11:
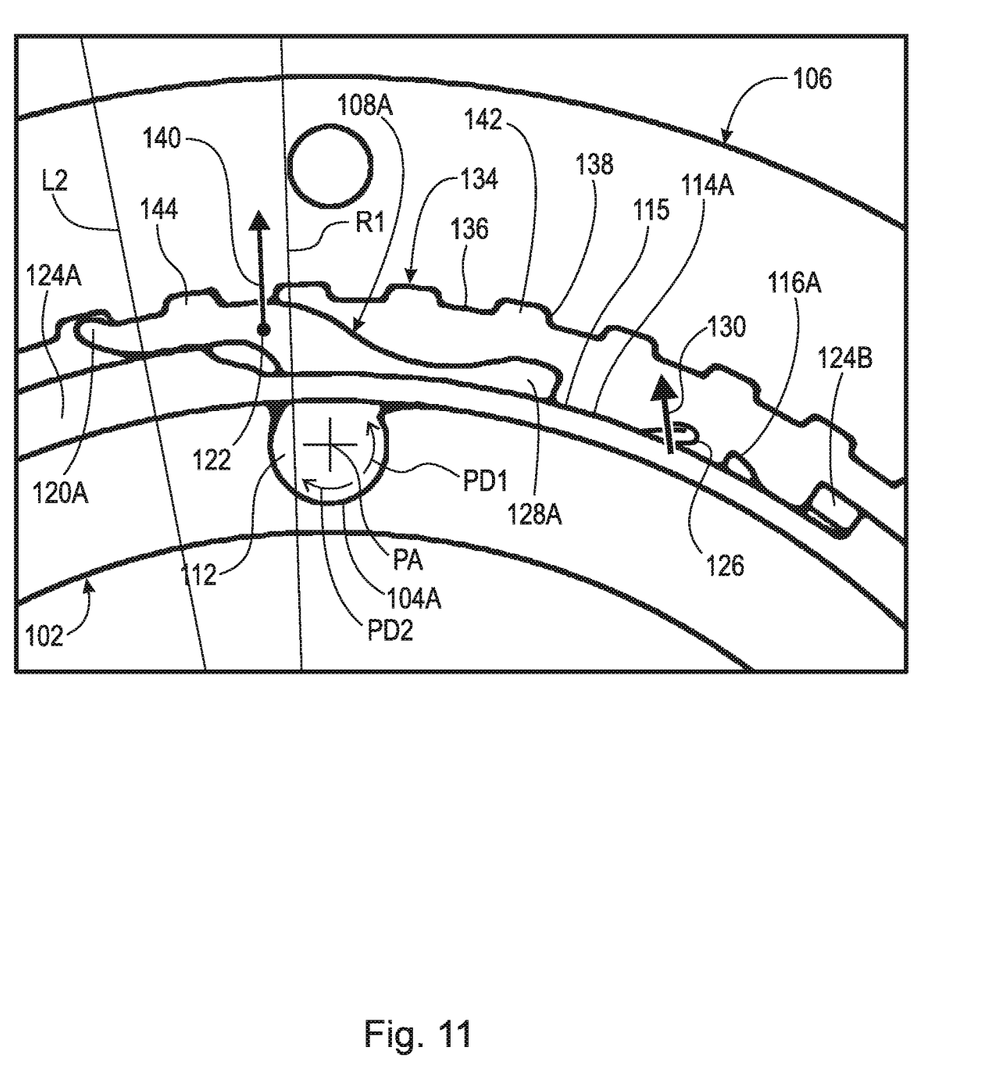
FIG. 11 is a detail of area 11 in FIG. 10.

FIG. 11 is a detail of area 11 in FIG. 10. The following should be viewed in light of FIGS. 1 through 11. In the locked mode of switchable ratcheting clutch 100: inner race 102, pawls 108, and outer race 106 are non-rotatably connected for: rotation of race 102 in direction CD1; and rotation of race 102 in direction CD2. In the locked mode of switchable ratcheting clutch 100: ramps 124 are in contact with pawls 108 and hold pawls 108, for example ends 120, in non-rotatable contact with outer race 106; and pawls 108 are free of contact with lift off bump stops 116.

In an example embodiment, center of gravity 122 of each pawl 108 is circumferentially off-set from pivot axis PA of the pawl 108 in the one-way mode and in the locked mode. Race 106 can be grounded (non-rotatable) or rotatable. If race 106 is grounded, further rotation of inner race 102 in direction CD1 or CD2 is blocked. If race 106 is rotatable, race 102 and race 106 are non-rotatably connected for rotation of race 102 in direction CD1 or direction CD2. In the example of FIG. 1, in the locked mode, for each pawls 108, a portion of the pawl 108 beyond axis PA of the pawl 108 in direction CD2, for example end 128, is in contact with a respective surface segment 114.

In the example of FIG. 1, to transition between the locked mode and the one-way mode, cage 110 is arranged to be rotated, with respect to inner race 102, by actuator A, which is schematically represented in FIG. 1. For example, to transition from the one-way mode to the locked mode, actuator A is arranged to rotate cage 110 in circumferential direction CD2 with respect to inner race 102. Ramps 124 are arranged to: contact pawls 108; slide along and under pawls 108 in direction CD2; pivot pawls 108 in pivot direction PD2 around pivot axis PA; and displace ends 120 radially outwardly and into non-rotatable contact with outer race 106. Ends 128 are arranged to overcome forces 130 and compress resilient elements 126. Actuator A can be any actuator known in the art. In an example embodiment, clutch 100 includes actuator A.

In the example of FIG. 1, to transition from the locked mode to the one-way mode, cage 110 is arranged to be rotated, with respect to inner race 102, by actuator A, in circumferential direction CD1. Ramps 124 are arranged to slide along and from under pawls 108 in direction CD1. Resilient elements 126 are arranged to: pivot pawls 108 in pivot direction PD1 as pawls 108 disengage from ramps 124; and displace ends 128 radially outwardly. If outer race 106 is grounded, elements 126 displace ends 128 radially outwardly into contact with outer race 106. If inner race 102 is rotating with respect to outer race 106, the extent of the radially outward displacement of end 128 depends on the speed of rotation of inner race 102 as discussed below. Thus, in the one-way mode and in the locked mode, cage 110 is in different respective circumferential positions with respect to inner race 102.

Thus, in the one-way mode: pawls 108 overlap stops 116 in direction RD1 and do not overlap ramps 124 in direction RD1. For example in FIGS. 1 and 6: line l1, orthogonal to axis AR, passes through pawl 108A and stop 116A; and no line orthogonal to axis of rotation AR passes through pawl 108A and ramp 124A. Thus, in the locked mode: pawls 108 overlap ramps 124 in direction RD1 and do not overlap stops 116 in direction RD1. For example in FIG. 10: line L2, orthogonal to axis AR, passes through pawl 108A and ramp 124A; and no line orthogonal to axis of rotation AR passes through pawl 108A and stop 116A.

The discussion that follows is directed to a pawl 108A; however it is understood that the discussion is applicable to every pawl 108. In the one-way mode, rotation of inner race 102 in direction CD1 generates centrifugal force 140 acting radially outwardly from center of gravity 122. Since center of gravity 122 is off-set from pivot axis PA in direction CD1, force 140 urges pawl 108A in direction PD2. In the first phase of the one-way mode, inner race 102 is rotating at or below a threshold speed of rotation and spring force 130 overcomes centrifugal force 140 to maintain contact of pawl 108A with outer race 106 and prevent rotation of pawl 108A in direction PD2.

To transition from the first phase of the one-way mode to the second phase of the one-way mode: the speed of rotation of inner race 102 in direction CD1 increases beyond the threshold speed; and centrifugal force 140 overcomes force 130, rotating pawl 108A in direction PD2 and compressing resilient element 126A with pawl 108A. Rotation of pawl 108A in direction PD2 disengages end 128A from outer race 106. However, before pawl 108A can rotate far enough in direction PD2 to contact race 106 with end 120A, end 128A contacts bump stop 116A, blocking further rotation of pawl 108A in direction PD2. Thus, race 102 and pawl 108A continue to rotate in direction CD1, but without pawl 108A contacting race 106.

To transition from the second phase of the one-way mode to the first phase of the one-way mode: the speed of rotation of inner race 102 in direction CD1 decreases to less than or equal to the threshold speed; and resilient element 126A expands as force 130 overcomes force 140, rotating pawl 108A in direction PD1. Rotation of pawl 108A in direction PD1 engages end 128A with outer race 106 as described above.

A dimension of gap 141, between pawl 108A and outer race 106 in the second phase of the one-way mode is determined according to the requirements of a particular application of clutch. For example: the dimension can be sized to provide a minimal clearance between pawl 108A and outer race 106; or the dimension can be sized to provide a larger clearance between pawl 108A and outer race 106.

Returning to a consideration of all of pawls 108, in an example embodiment: teeth 136 bound spaces 142; ends 120 include teeth 144; and for the locked mode, teeth 144 are arranged to slide into respective spaces 142.

The following should be viewed in light of FIGS. 1 through 11. The following describes a method of operating a switchable ratcheting clutch including inner race 102, outer race 106, cage 110 radially disposed between inner race 102 and outer race 106, and pawl 108A including portion 112 disposed in pocket 104A formed by inner race 102.

For a first phase of a one-way mode of switchable ratcheting clutch 100, a first step: rotates, with respect to outer race 106 and at or below a threshold speed of rotation, inner race 102 in circumferential direction CD1; precludes contact between pawl 108A and lift off bump stop 116A extending radially outwardly from radially outer surface segment 114A of cage 110; contacts outer race 106 with pawl 108A; and slides pawl 108A along outer race 106 in circumferential direction CD1. To transition to a second phase of the one-way mode, a second step: increases the speed of rotation of inner race 102 to above the threshold speed of rotation; pivots, in pivot direction PD2 pawl 108A around pivot axis PA passing through pawl 108A and pocket 104A; breaks contact between pawl 108A and outer race 106; contacts lift off bump stop 116A with pawl 108A; and blocks, with lift off bump stop 116A, further pivoting of pawl 108A in pivot direction PD2.

A third step urges, with resilient element 126A and with force 130, pawl 108A in pivot direction PD1. A fourth step generates, via rotation of inner race 102 in circumferential direction CD1, centrifugal force 140 acting from center of gravity 122 of pawl 108A. Transitioning from the first phase of the one-way mode to the second phase of the one-way mode includes overcoming force 130 with centrifugal force 140. Transitioning from the second phase of the one-way mode to the first phase of the one-way mode includes overcoming centrifugal force 140 with force 130.

To transition from the one-way mode to a locked mode of switchable ratcheting clutch 100, a fifth step: displaces, with respect to inner race 102 and with actuator A cage 110 in circumferential direction CD2; pivots with ramp 124A extending radially outwardly from radially outer surface segment 114A, pawl 108A in pivot direction PD2; and non-rotatably connects pawl 108A and outer race 106 for rotation of inner race 102 in circumferential direction CD1 or in circumferential direction CD2.

While in the first phase of the one-way mode, a sixth step: reverses a direction of rotation of inner race 102 to direction CD2, and non-rotatably connecting pawl 108A to outer race 106. While in the second phase of the one-way mode, a seventh step reverses a direction of rotation of inner race 102 to direction CD2, contacts outer race 106 with pawl 108A, and non-rotatably connecting pawl 108A to outer race 106.

It is understood that the orientations and directions described above are examples only and that the orientations and directions can be changed. For example the following can be reversed: the circumferential positions of ends 120 and 128 with respect to pockets 104; the positions of bump stops 116, ramps 124, and resilient elements 126, with respect to pockets 104; and the directions of rotation for the one-way mode, and the locked mode.

As the speed of rotation of inner race 102 in direction CD1 increases in the one-way mode, drag between pawls 108 and outer race 106 increases due to the contact of ends 128 with outer race 106. To eliminate contact between pawls 108 and outer race 106 and the drag noted above at speeds of rotation for inner race 102 above the threshold speed for each pawl 108, the center of gravity 122 is off-set in direction CD1 from pivot axis PA. As a result of the off-set of center of gravity 122 and pivot axis PA, in the second phase of the one-way mode: centrifugal forces 140 cause pawls 108 to rotate in direction PD2; ends 128 break contact with race 106; ends 128 contact bump stops 116, and ends 120 are prevented from contacting race 106 and initiating an unplanned transition to the locked mode. Eliminating the drag noted above enhances performance of clutch 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AR axis of rotation
AD axial direction
CD1 circumferential direction
CD2 circumferential direction
L1 line
L2 line
PA pivot axis
PD1 pivot direction
PD2 pivot direction
R1 radius
RD1 radially outer direction
RDT radial distance
100 switchable ratcheting clutch
102 inner race
104 pocket
106 outer race
108 pawl
108A pawl
110 cage
112 portion, pawl
114 radially outer surface segment, cage
114A radially outer surface segment, cage
116 lift off bump stop, cage
116A lift off bum stop, cage
120 circumferential end, pawl
122 center of gravity, pawl
124 ramp, cage
124A ramp, cage
124B ramp, cage
126 resilient element
128 circumferential end, pawl
130 spring force
132 indentation, inner race
134 radially inner surface, outer race
136 tooth, outer race
138 wall, tooth
140 centrifugal force
141 gap
142 space, outer race
144 tooth, pawl

The invention claimed is:

1. A switchable ratcheting clutch, comprising:
an inner race forming a pocket and supported for rotation about an axis of rotation;
an outer race;
a pawl including a portion pivotably disposed in the pocket; and, a cage radially disposed between the inner race and the outer race, the cage including:
a radially outer surface segment; and,
a lift off bump stop extending radially outwardly from the radially outer surface segment, wherein:
for a one-way mode of the switchable ratcheting clutch, the inner race is arranged to rotate, with respect to the outer race, only in a first circumferential direction;
for a first phase of the one-way mode, the inner race is arranged to rotate in the first circumferential direction and the pawl is arranged to be in contact with the outer race and free of contact with the lift off bump stop; and,
for a second phase of the one-way mode:
the inner race is arranged to rotate in the first circumferential direction; and,
the pawl is arranged to be in contact with the lift off bump stop and free of contact with the outer race.

2. The switchable ratcheting clutch of claim 1, wherein:
in the first phase of the one-way mode, the pawl is arranged to be in contact with the radially outer surface segment; and,
in the second phase of the one-way mode, the pawl is arranged to be free of contact with the radially outer surface segment.

3. The switchable ratcheting clutch of claim 1, wherein:
the pawl is pivotable within the pocket around a pivot axis passing through the pawl and the pocket and parallel to the axis of rotation;
the pawl includes a center of gravity; and,
the center of gravity is circumferentially off-set from the pivot axis in the second phase of the one-way mode.

4. The switchable ratcheting clutch of claim 3, wherein the center of gravity is circumferentially off-set from the pivot axis in the first circumferential direction.

5. The switchable ratcheting clutch of claim 1, wherein:
the pawl is pivotable within the pocket around a pivot axis passing through the pawl and the pocket and parallel to the axis of rotation; and,
the lift off bump stop is off-set from the pivot axis in a second circumferential direction, opposite the first circumferential direction.

6. The switchable ratcheting clutch of claim 1, wherein:
the cage includes a ramp extending radially outwardly from the radially outer surface segment;
the pocket is circumferentially disposed between the ramp and the lift off bump stop; and,
in a locked mode of the switchable ratcheting clutch:
the inner race, the pawl, and the outer race are non-rotatably connected;
the ramp is arranged to hold the pawl in contact with the outer race; and,
the pawl is free of contact with the lift off bump stop.

7. The switchable ratcheting clutch of claim 6, wherein:
in the one-way mode:
the cage is in a first circumferential position with respect to the inner race; and,
the pawl does not overlap the ramp in a radially outer direction;
in the locked mode:
the cage is in a second circumferential position, different from the first circumferential position, with respect to the inner race; and,
the pawl does not overlap the lift off bump stop in the radially outer direction; and,
the cage is arranged to be circumferentially displaced by an actuator to switch between the one-way mode and the locked mode.

8. The switchable ratcheting clutch of claim 1, wherein in a locked mode of the switchable ratcheting clutch:
the inner race, the pawl, and the outer race are non-rotatably connected for rotation of the inner race in the first circumferential direction or in a second circumferential direction, opposite the first circumferential direction; and,
the lift off bump stop is located beyond the pawl in the second circumferential direction.

9. The switchable ratcheting clutch of claim 1, wherein the pawl is pivotable within the pocket around a pivot axis passing through the pawl and the pocket and parallel to the axis of rotation, the switchable ratcheting clutch further comprising:
a resilient element:
circumferentially disposed between the pocket and the lift off bump stop; and,
urging the pawl in a first pivot direction around the pivot axis, wherein:
to transition from the first phase of the one-way mode to the second phase of the one-way mode:
the cage is arranged to pivot the pawl in a second pivot direction, opposite the first pivot direction; and,
the pawl is arranged to compress the resilient element; and,
to transition from the second phase of the one-way mode to the first phase of the one-way mode, the resilient element is arranged to pivot the pawl in the first pivot direction.

10. The switchable ratcheting clutch of claim 1, wherein:
the switchable ratcheting clutch is arranged to transition from the first phase of the one-way mode to the second phase of the one-way mode when a speed of rotation of the inner race, in the first circumferential direction, increases beyond a threshold speed of rotation; and,
the switchable ratcheting clutch is arranged to transition from the second phase of the one-way mode to the first phase of the one-way mode when the speed of rotation of the inner race, in the first circumferential direction, decreases to be equal to or less than the threshold speed of rotation.

11. A switchable ratcheting clutch, comprising:
an inner race forming a pocket and supported for rotation about an axis of rotation;
an outer race;
a pawl:
including a portion disposed in the pocket, the portion of the pawl non-rotatable with respect to the inner race in a first circumferential direction around the axis of rotation;
pivotable around a pivot axis passing through the portion and the pocket and parallel to the axis or rotation; and,
including a center of gravity circumferentially off-set from the pivot axis in the first circumferential direction;
a cage radially disposed between the inner race and the outer race, the cage including:
a radially outer surface segment; and,
a lift off bump stop extending radially outwardly from the radially outer surface segment, wherein:
for a one-way mode of the switchable ratcheting clutch, the inner race is rotatable, with respect to the outer race, only in the first circumferential direction;
for a first phase of the one-way mode:
the inner race is arranged to rotate in the first circumferential direction; and, the pawl is in contact with the outer race and free of contact with the lift off bump stop; and, for a second phase of the one-way mode:
the inner race is arranged to rotate in the first circumferential direction; and,
the pawl is in contact with the lift off bump stop and free of contact with the outer race; and, for a locked mode of the switchable ratcheting clutch the inner race, the pawl, and the outer race are non-rotatably connected for rotation of the inner race in the first circumferential direction or a second circumferential direction, opposite the first circumferential direction.

12. The switchable ratcheting clutch of claim 11, wherein:
the switchable ratcheting clutch is arranged to transition from the first phase of the one-way mode to the second phase of the one-way mode when a speed of rotation of the inner race, in the first circumferential direction, increases beyond a threshold speed of rotation; and,
the switchable ratcheting clutch is arranged to transition from the second phase of the one-way mode to the first phase of the one-way mode when the speed of rotation of the inner race in the first circumferential direction, decreases to be equal to or less than the threshold speed of rotation.

13. The switchable ratcheting clutch of claim 11, wherein in a connect mode of the switchable ratcheting clutch:
rotation of the inner race, with respect to the outer race, is blocked only in the second circumferential direction;
the pawl is arranged to contact the outer race; and,
the pawl is arranged to be free of contact with the lift off bump stop.

14. The switchable ratcheting clutch of claim 11, wherein:
in the first phase of the one-way mode, the pawl is in contact with the outer race; and,
in the second phase of the one-way mode, the pawl is free of contact with the outer race.

15. The switchable ratcheting clutch of claim 11, further comprising:
a resilient element:
circumferentially disposed between the pocket and the lift off bump stop; and,
urging the pawl in a first pivot direction around the pivot axis, wherein:
for the first phase of the one-way mode, the resilient element is arranged to pivot the pawl into contact with the outer race; and,
for the second phase of the one-way mode, the pawl is arranged to compress the resilient element.

16. The switchable ratcheting clutch of claim 15, wherein:
a rotation of the pawl in the first circumferential direction is arranged to generate a centrifugal force from the center of gravity; and,
to transition from the first phase of the one-way mode to the second phase of the one-way mode, the centrifugal force is arranged to pivot the pawl in a second pivot direction, opposite the first pivot direction.

17. A method of operating a switchable ratcheting clutch including an inner race, an outer race, a cage radially disposed between the inner race and the outer race, and a pawl including a portion disposed in a pocket formed by the inner race, the portion of the pawl non-rotatable with respect to the inner race in a first circumferential direction around an axis of rotation around which the switchable ratcheting clutch is supported for rotation, the method comprising:
for a first phase of a one-way mode of the switchable ratcheting clutch:
rotating, with respect to the outer race and at or below a threshold speed of rotation, the inner race in the first circumferential direction;
precluding contact between the pawl and a lift off bump stop extending radially outwardly from a radially outer surface segment of the cage; and,
contacting the outer race with the pawl; and,
to transition to a second phase of the one-way mode:
increasing the speed of rotation of the inner race to above the threshold speed of rotation;
pivoting, in a first pivot direction, the pawl around a pivot axis passing through the pawl and the pocket and parallel to the axis of rotation;
breaking contact between the pawl and the outer race;
contacting the lift off bump stop with the pawl; and,
blocking, with the lift off bump stop, further pivoting of the pawl in the first pivot direction.

18. The method of claim 17, further comprising:
urging, with a resilient element and with a first force, the pawl in a second pivot direction, opposite the first pivot direction; and,
generating, via rotation of the inner race in the first circumferential direction, a centrifugal force, wherein:
transitioning from the first phase of the one-way mode to the second phase of the one-way mode includes overcoming the first force with the centrifugal force; and,
transitioning from the second phase of the one-way mode to the first phase of the one-way mode includes overcoming the centrifugal force with the first force.

19. The method of claim 17, further comprising:
to transition from the one-way mode to a locked mode of the switchable ratcheting clutch:
displacing, with respect to the inner race and with an actuator, the cage in a second circumferential direction, opposite the first circumferential direction;
pivoting, with a ramp extending radially outwardly from the radially outer surface segment, the pawl in the first pivot direction; and,
non-rotatably connecting the pawl and the outer race for rotation of the inner race in the first circumferential direction or in the second circumferential direction.

20. The method of claim 17, further comprising:
while in the first phase of the one-way mode:
reversing a direction of rotation of the inner race to a second circumferential direction, opposite the first circumferential direction; and,
non-rotatably connecting the pawl to the outer race; or,
while in the second phase of the one-way mode:
reversing a direction of rotation of the inner race to a second circumferential direction, opposite the first circumferential direction;
contacting the outer race with the pawl; and,
non-rotatably connecting the pawl to the outer race.

* * * * *